US011436902B2

(12) United States Patent
Hamilton et al.

(10) Patent No.: US 11,436,902 B2
(45) Date of Patent: Sep. 6, 2022

(54) LIGHTING FIXTURE HAVING AN ENVIRONMENTAL DETECTION SYSTEM

(71) Applicant: Hubbell Incorporated, Shelton, CT (US)

(72) Inventors: Douglas Matthew Hamilton, Arlington Heights, IL (US); Blake Ashton Nickles, Greenville, SC (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 17/108,058

(22) Filed: Dec. 1, 2020

(65) Prior Publication Data

US 2021/0082262 A1    Mar. 18, 2021

Related U.S. Application Data

(63) Continuation of application No. 16/123,498, filed on Sep. 6, 2018, now Pat. No. 10,854,052.

(60) Provisional application No. 62/562,762, filed on Sep. 25, 2017.

(51) Int. Cl.
| | | |
|---|---|---|
| *G08B 7/06* | (2006.01) | |
| *F21V 33/00* | (2006.01) | |
| *G08B 17/10* | (2006.01) | |
| *G08B 21/14* | (2006.01) | |
| *H02J 9/06* | (2006.01) | |
| *F21V 23/04* | (2006.01) | |
| *F21Y 115/10* | (2016.01) | |

(52) U.S. Cl.
CPC ............ *G08B 7/06* (2013.01); *F21V 23/0442* (2013.01); *F21V 33/0076* (2013.01); *G08B 17/10* (2013.01); *G08B 21/14* (2013.01); *H02J 9/06* (2013.01); *H02J 9/065* (2013.01); *F21Y 2115/10* (2016.08)

(58) Field of Classification Search
CPC .......... G08B 7/06; G08B 17/10; G08B 21/14; F21V 23/0442; F21V 33/0076; F21Y 115/10; H02J 9/06; H02J 9/065
See application file for complete search history.

(56) References Cited

U.S. PATENT DOCUMENTS

| | | | | |
|---|---|---|---|---|
| 4,167,688 A | * | 9/1979 | Burek | G08C 19/30 315/178 |
| 4,258,291 A | * | 3/1981 | Scott | G08B 17/10 315/156 |
| 4,380,760 A | * | 4/1983 | Kornblit | G08B 29/181 340/333 |
| 4,896,145 A | * | 1/1990 | Lewkowicz | G08B 17/00 340/693.1 |
| 4,980,672 A | * | 12/1990 | Murphy | G08B 13/1409 315/136 |

(Continued)

FOREIGN PATENT DOCUMENTS

WO    2016179655    11/2016

*Primary Examiner* — Ojiako K Nwugo
(74) *Attorney, Agent, or Firm* — Michael Best & Friedrich LLP

(57) ABSTRACT

A lighting fixture is provided. The lighting fixture includes a light source and an environmental detection system. The environmental detection system is coupled to a continuous supply of electrical power. The environmental detection system includes one or more sensors operable to detect a parameter associated with a space in which the lighting fixture is located.

20 Claims, 9 Drawing Sheets

(56) References Cited

U.S. PATENT DOCUMENTS

| | | | | |
|---|---|---|---|---|
| 6,448,888 B1* | 9/2002 | Horner | G08B 21/12 | 180/271 |
| 6,492,907 B1* | 12/2002 | McCracken | G08B 17/00 | 340/539.1 |
| 7,585,087 B2* | 9/2009 | Gagne | H05B 47/195 | 362/221 |
| 9,831,673 B1* | 11/2017 | Yu | H01H 47/00 | |
| 2006/0082462 A1* | 4/2006 | Crook | G01N 33/0075 | 340/632 |
| 2009/0021955 A1* | 1/2009 | Kuang | H05B 47/11 | 362/479 |
| 2011/0084844 A1* | 4/2011 | Carnation | G08B 21/14 | 340/628 |
| 2011/0304268 A1* | 12/2011 | Bertram | H05B 45/20 | 315/46 |
| 2013/0169430 A1* | 7/2013 | Shook | G08B 17/10 | 340/539.1 |
| 2014/0104067 A1* | 4/2014 | Chien | G08B 17/10 | 340/628 |
| 2014/0218194 A1* | 8/2014 | Gruber | G08B 17/10 | 340/540 |
| 2014/0266747 A1* | 9/2014 | Prendergast | G08B 17/10 | 340/628 |
| 2014/0266764 A1* | 9/2014 | Henrie | G08B 5/38 | 340/691.1 |
| 2014/0292208 A1* | 10/2014 | Chemel | H05B 47/17 | 315/154 |
| 2015/0043200 A1* | 2/2015 | Wilson | F21S 9/043 | 362/145 |
| 2015/0091451 A1* | 4/2015 | Williams | H01R 33/9453 | 315/160 |
| 2015/0124100 A1* | 5/2015 | McRory | F21S 8/085 | 348/151 |
| 2015/0173145 A1* | 6/2015 | Lee | H05B 45/397 | 315/200 R |
| 2016/0102814 A1* | 4/2016 | Green | F21K 9/275 | 362/221 |
| 2016/0195856 A1* | 7/2016 | Spero | G06N 5/046 | 700/90 |
| 2017/0290129 A1* | 10/2017 | Kashani | H05B 47/11 | |
| 2018/0035518 A1* | 2/2018 | Cook | H05B 47/19 | |

\* cited by examiner

LIGHTING FIXTURE HAVING AN ENVIRONMENTAL DETECTION SYSTEM

PRIORITY CLAIM

The present application is a continuation of U.S. application Ser. No. 16/123,498, titled "Lighting Fixture Having an Environmental Detection System," having a filing date of Sep. 6, 2018 which is based on and claims priority to U.S. Provisional Application No. 62/562,762, titled "Lighting Fixture Having an Environmental Detection System," having a filing date of Sep. 25, 2017, which is incorporated by reference herein.

FIELD

The present disclosure relates generally to lighting fixtures.

BACKGROUND

A lighting fixture can include a light source that provides illumination for a room or area in which the lighting fixture is mounted. The light source can be selectively coupled to a power supply (e.g., mains power supply) via manipulation of a wall switch that is movable between at least a first position and a second position. When the switch is in the first position, the light source can receive electrical power from the power supply and can use the electrical power to illuminate the room or area. When the switch is in the second position, however, the light source cannot receive electrical power from the power supply. In this way, operation of the light source can be controlled via manipulation of the switch.

A smoke detector can be mounted in the room or area in which the lighting fixture is mounted. The smoke detector can include one or more sensors that receive electrical power from a battery positioned onboard the smoke detection. However, since the sensors receive electrical power from a battery, a user must regularly replace the battery to ensure proper operation of the smoke detector. Replacing the battery can be a rather burdensome task, especially when the smoke detector is mounted to the ceiling.

BRIEF DESCRIPTION

Aspects and advantages of embodiments of the present disclosure will be set forth in part in the following description, or may be learned from the description, or may be learned through practice of the embodiments.

In one aspect, the present disclosure is directed to a lighting fixture that includes a light source and an environmental detection system. The environmental detection system is coupled to a continuous supply of electrical power. The environmental detection system includes one or more sensors operable to detect a parameter associated with a space in which the lighting fixture is located.

In another aspect, the present disclosure is directed to a method for detecting an environmental condition associated with a room or area using an environmental detection system of a lighting fixture mounted in the room or area. The method includes receiving, at one or more control devices of the environmental detection system, data from a sensor of the environmental detection system. The data can be indicative of an environmental parameter associated with the room. The method includes determining, by the one or more control devices, whether the environmental parameter is within a range approved values for the environmental. In response to determining the environmental parameter is not within the range of approved values, the method further includes providing notification indicative of an environmental condition occurring within the room or area.

In yet another aspect, the present disclosure is directed to a system for detecting an environmental condition associated with a room or area. The system includes a lighting fixture disposed within the room or area. The lighting fixture includes a light source. The system further includes an environmental detection system disposed within the room or area. The environmental detection system is coupled to a continuous supply of electrical power. The environmental detection system includes one or more sensors operable to detect an environmental parameter associated with the room or area.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the disclosure.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
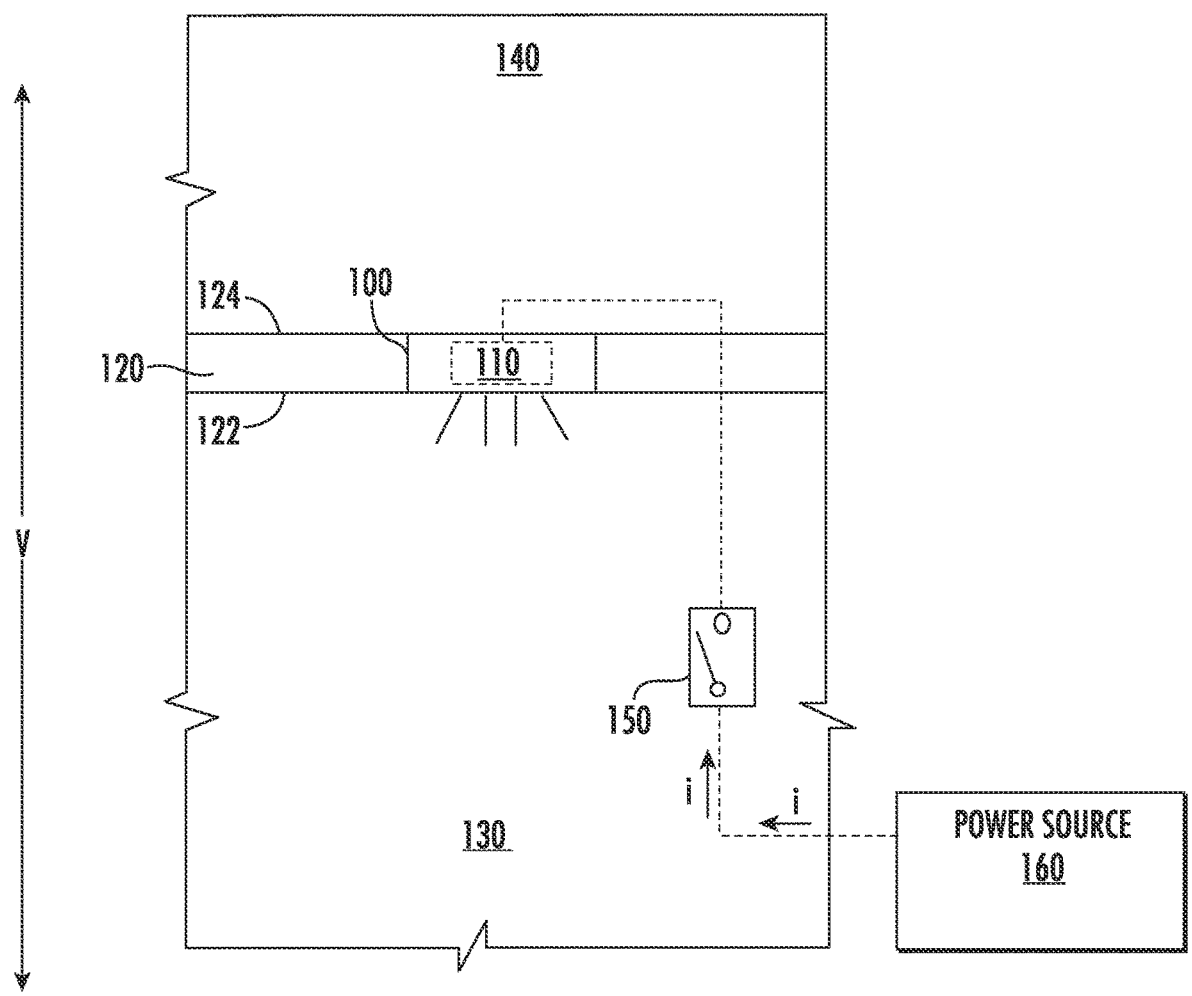
FIG. 1 provides a lighting fixture according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a lighting fixture. The lighting fixture can include one or more light sources (e.g., light emitting diode (LED) light sources) configured to illuminate a room in which the lighting fixture is mounted or located. The primary functionality of the lighting fixture can be to illuminate a space.

In addition, the lighting fixture can include an environmental detection system. The environmental detection system can receive electrical power (e.g., alternating current (AC) power, direct current (DC) power). In some embodiments, the electrical power can be a continuous source of electrical power, irrespective of a position of a switching device used to control power to the light source of the lighting fixture. The environmental detection system can be used to detect an environmental condition (e.g., fire, carbon monoxide, etc.) occurring within the room. As discussed below, the environmental detection system can take one or more actions based on the detected environmental condition.

In some implementations, the environmental detection system can include one or more sensors configured to detect an environmental parameter associated with the room. The environmental parameter can include, without limitation, a temperature of the room, a humidity of the room, presence and/or concentration of toxins (e.g., carbon monoxide) or other harmful substances in the room, or any other suitable parameter indicative of an environmental condition occurring within the room.

The environmental detection system can also include one or more control devices. As used herein, a control device refers to components used to perform computations and can include one or more processors and one or more memory devices, etc. The control device can be used in communication with the sensors. In this way, the control device can receive one or more data signals from the sensors. In addition, the control device can be communicatively coupled to other devices (e.g., servers, user devices, control systems, etc.). In this way, the control device can communicate information (e.g., data signals collected from the sensors) to the other devices (e.g., servers, user devices, control systems etc.). For instance, the control device can communicate data from the sensors to a user device (e.g., smartphone, tablet, wearable device, etc.) for observation by the user.

The control device of the environmental detection system can communicate directly with other devices (e.g., using peer-to-peer communication) and/or with other devices over a network. The network can be any suitable type of network, such as a local area network (e.g., intranet), wide area network (e.g., internet), low power wireless network (e.g., Bluetooth Low Energy (BLE), Zigbee, etc.), cellular network, or some combination thereof and can include any number of wired or wireless links. In general, communication over the network can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable wired and/or wireless communication technologies can be used without deviating from the scope of the present disclosure.

In some implementations, the control device can be configured to control operation of various output devices (e.g., a speaker, display screen, visual indicator, etc.) based, at least in part, on data collected via the sensors of the environmental detection system. For instance, the control device can be configured to perform a control action associated with emitting an audible alert or notification via the speaker of the environmental detection system. Alternatively or additionally, the control device can be configured to perform a control action associated with communicating a notification (e.g., SMS text message, email, etc.) to a user device (e.g., smartphone, laptop, etc.). In this manner, a user can become apprised of an environmental condition (e.g., fire) occurring within a room or area in which the lighting fixture is mounted.

In some embodiments, the control device can be configured to control operation of the one or more light sources of the light fixture based on data signals from the sensor(s). For instance, the one or more control devices can be configured to flash the one or more light sources in response to a detected environmental condition. More specifically, the detected environmental condition can be a fire occurring within the room or area in which the lighting fixture is located. Alternatively, the detected environmental condition can be a carbon monoxide (CO) leak occurring in the room or area.

Referring now to the FIGS., FIG. 1 depicts a lighting fixture 100 disposed within a ceiling 120 that extends between a first surface 122 and a second surface 124 along a vertical direction V. As shown, the ceiling 120 can separate a first space 130 (e.g., positioned beneath the ceiling 110) from a second space 140 (e.g., positioned above the ceiling 110) along the vertical direction V. In some implementations, the first space 130 can include a room (e.g., kitchen, living room, etc.) of a residential home, and the second space 140 can include an attic positioned above the room.

The lighting fixture 100 can include a light source 110 to provide illumination for the first space 130. As shown, the light source 110 can be disposed within the lighting fixture 100. In some implementations, the light source 110 can include one or more light emitting diodes (LED) devices or any other suitable light source. As discussed below, operation of the light source 110 can be controlled via manipulation of a wall switch 150.

Figure 2:
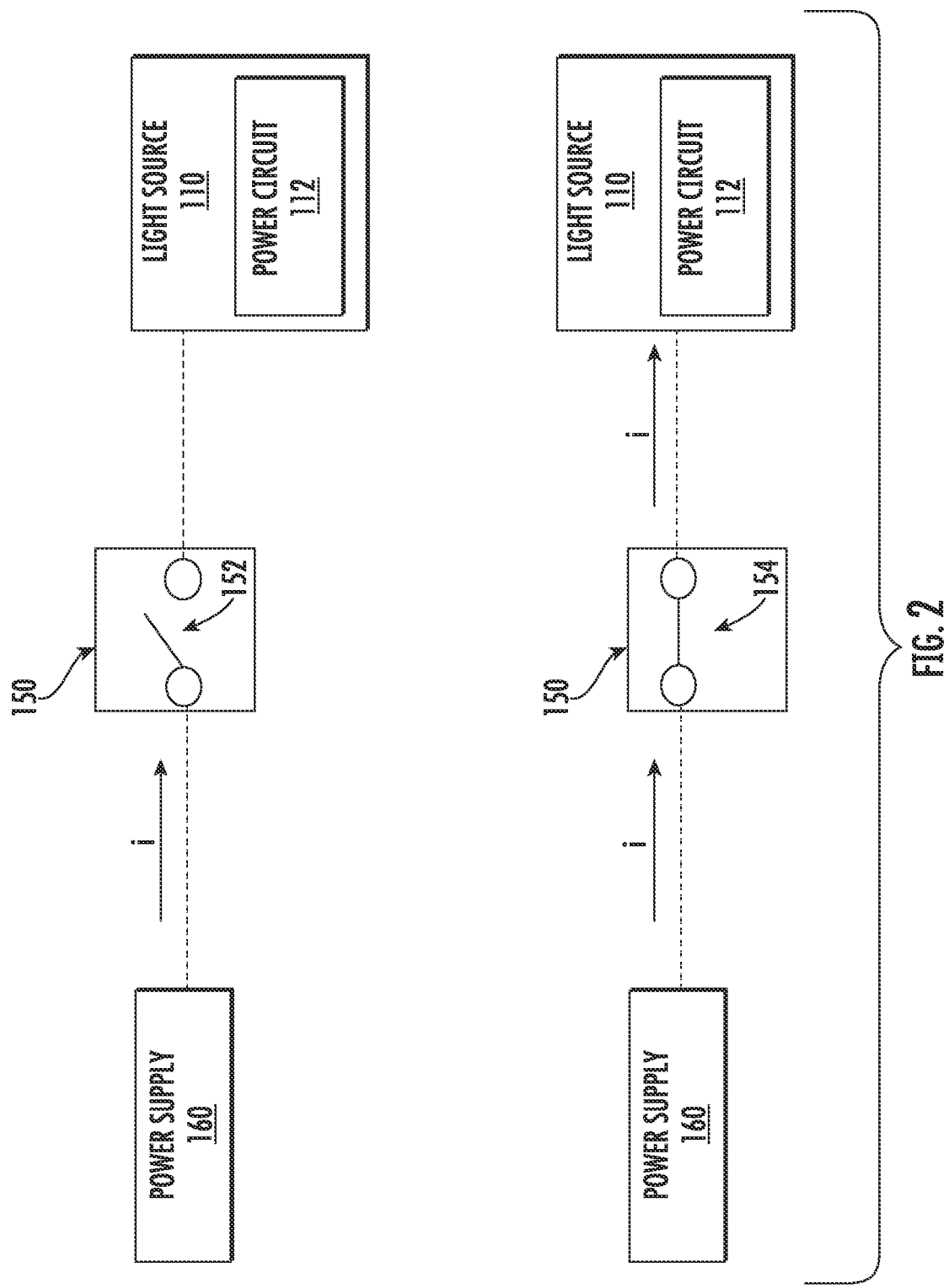
FIG. 2 provide a schematic of a circuit according to example embodiments of the present disclosure.

Referring briefly now to FIG. 2, the light source 110 can include a power circuit 112 configured to receive an input power from a power supply 160 (e.g., an AC or DC power supply) and convert the input power to an output power suitable for powering the light source 110. In example embodiments, the power supply 160 can be a mains power supply (e.g., AC power supply). Alternatively and/or additionally, the power supply 160 can comprise a backup power supply (e.g., uninterruptable power supply) configured to provide electrical power in the event the mains power supply becomes inoperable due to, for instance, a power outage.

In some instances, the light source 110 can include an array of LED light sources, and the power circuit 112 can be configured to provide different driver currents to each of the LED light sources. For instance, the power circuit 112 can include one or more of a multi-channel driver circuit, a current splitter circuit, one or more current regulators, and/or other devices that can be used to independently provide a driver current to each of the LED light sources.

As mentioned above, the switch 150 can be used to control operation of the light source 110. More specifically, the switch 150 can be used to selectively couple the light source 110 to the power supply 160. For instance, in some implementations, the switch 150 can be a single pole single throw (SPST) switch movable between a first position 152 and a second position 154. When the switch 150 is in the first position 152, the light source 110 is decoupled (e.g., not in electrical communication) from the power supply 160. In contrast, when the switch 150 is in the second position 154, the light source 110 is coupled to the power supply 160. In this way, the switch 150 can be used to activate (e.g., turn on) and deactivate (e.g., turn off) the light source 110.

Figure 3:
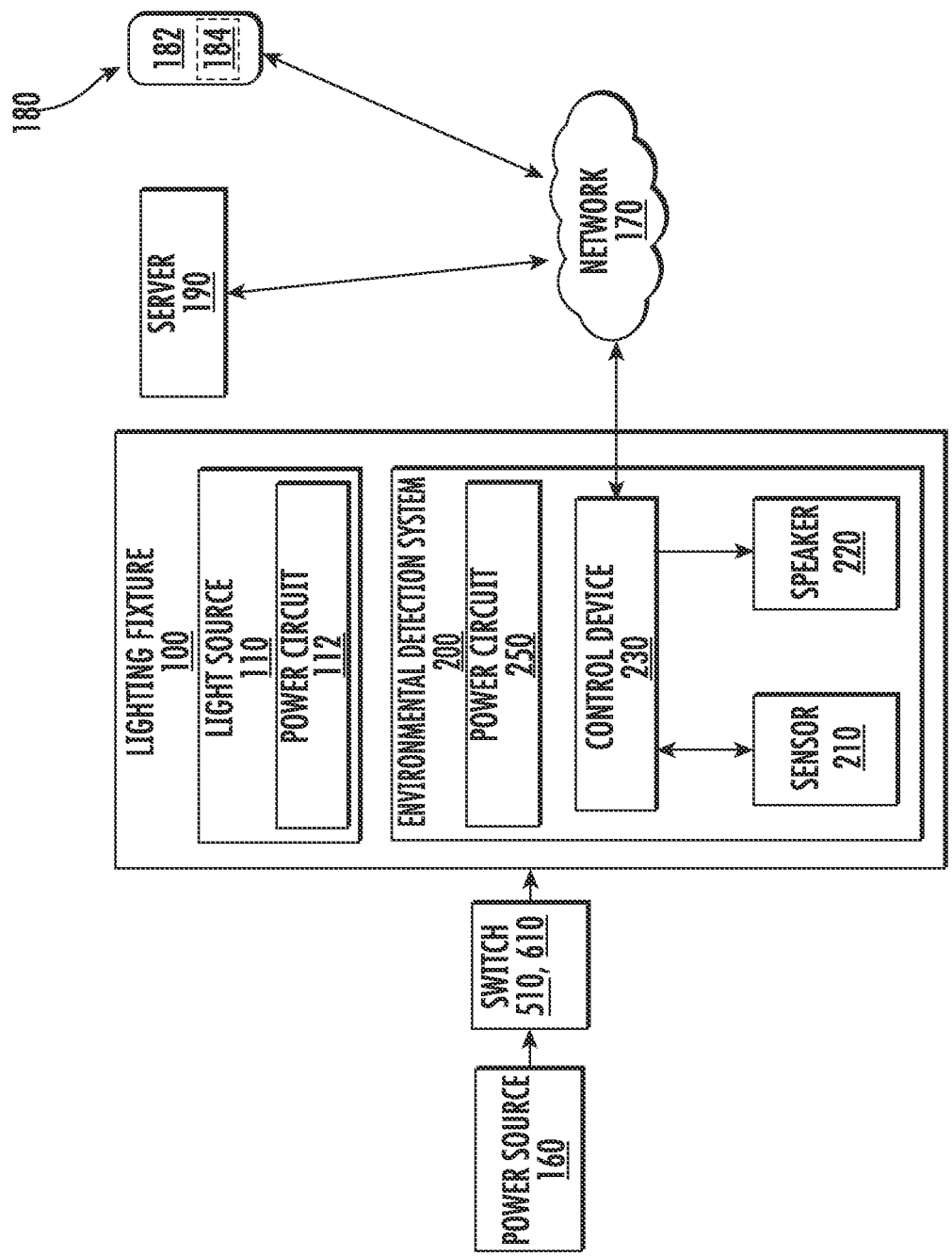
FIG. 3 provides an environmental detection system for a lighting fixture according to example embodiments of the present disclosure.

Referring now to FIG. 3, the lighting fixture 100 can include an environmental detection system 200 according to example embodiments of the present disclosure. As shown, the environmental detection system 200 can include one or more sensors 210 coupled to the lighting fixture 100 and operable to sense an environmental parameter associated with the first space 130. For instance, the environmental parameter sensed by the sensors(s) 210 can include an amount of smoke present within the first space 130. In this way, the sensor(s) 210 can collect data that can be used to determine whether an environmental condition (e.g., fire) is occurring within the first space 130. It should be appreciated, however, that the sensor(s) 210 can be configured to detect any suitable environmental parameter. For example, the sensors(s) 210 can be operable to detect an amount of carbon monoxide (CO) present within the first space 130. In this way, the sensor(s) 210 can collect data that can be used to determine whether there is a CO leak within the first space 130.

As shown, the environmental detection system 200 can include a speaker 220. More specifically, the speaker 220 can be coupled to or located within the lighting fixture 100. The speaker 220 can convert electrical signals into audible sounds. In some implementations, the speaker 220 can be used to emit audible notifications (e.g., warnings) to one or more persons within the first space 130. For instance, the speaker 220 can emit an audible alert when it is determined that an environmental condition, such as a fire, is occurring within the first space 130.

As shown, the environmental detection system 200 can include one or more control devices 230. In some implementations, the control device(s) 230 can be coupled to the lighting fixture 100. As will be discussed below in more detail, the control device(s) 230 can perform one or more control actions based on data signals received from the sensors(s) 210.

Figure 4:
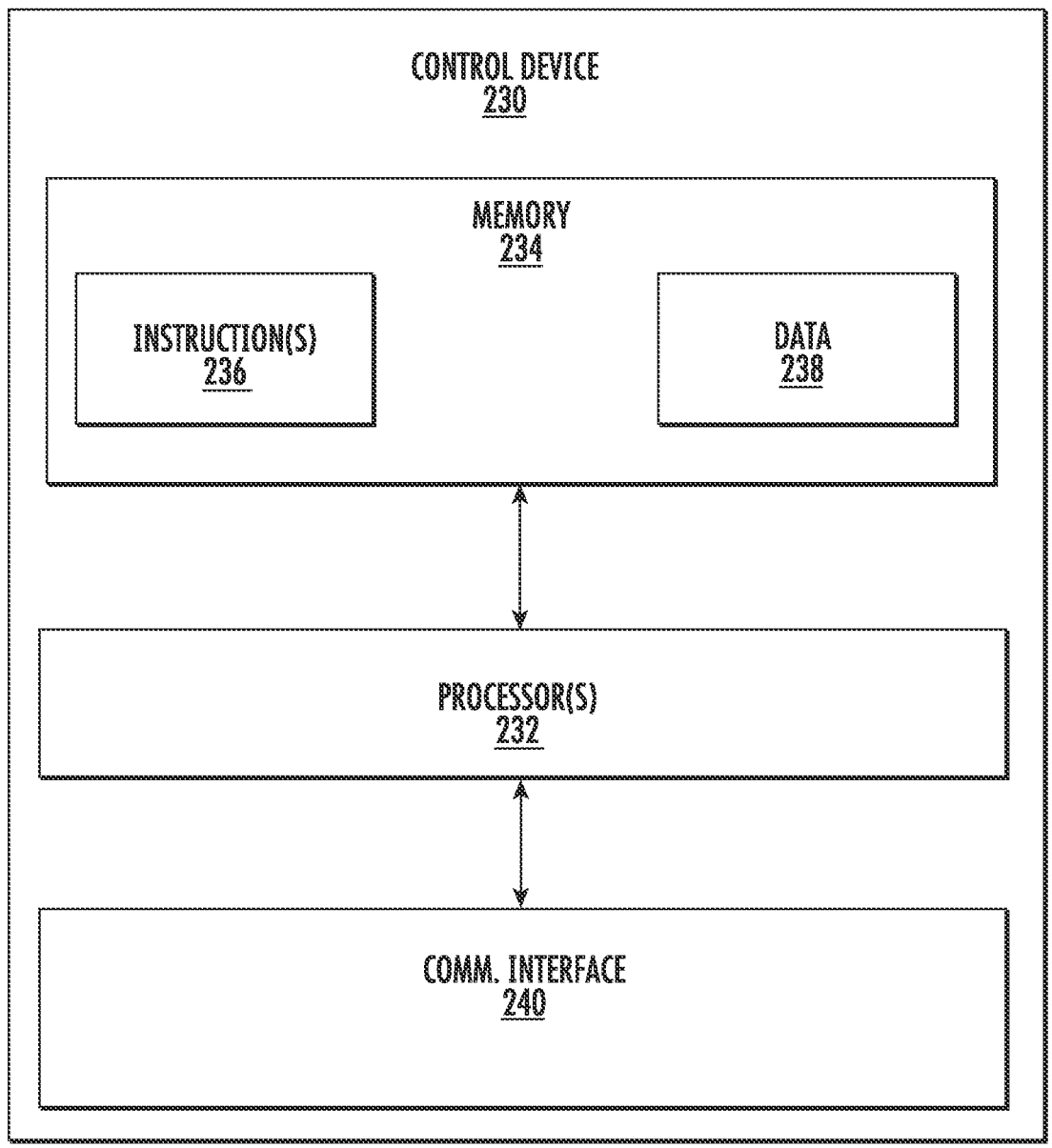
FIG. 4 provides a block diagram of an example control device according to example embodiments of the present disclosure.

FIG. 4 illustrates one embodiment of suitable components of the control device(s) 230. As shown, the control device(s) 230 can include at least one processor 232 and associated memory device 234 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Examples of the memory device 234 can include computer-readable media including, but not limited to, non-transitory computer-readable media, such as RAM, ROM, hard drives, flash drives, or other suitable memory devices.

The memory device 234 can store information accessible by the processor(s) 232, including computer-readable instructions 236 that can be executed by the processor(s) 232. The computer-readable instructions 236 can be any set of instructions that, when executed by the processor(s) 232, cause the processor(s) 232 to perform operations. The computer-readable instructions 236 can be software written in any suitable programming language or can be implemented in hardware. In some implementations, the computer-readable instructions 236 can be executed by the processor(s) 232 to perform operations, such as performing a control action associated with presenting an alarm or notification based on an environmental parameter associated with the room or space in which the lighting fixture 100 is located. For instance, the processor(s) 232 can perform the control action when the environmental parameter falls outside a range of approved values. The memory device 234 can further store data 238 that can be accessed by the control device(s) 230. In example embodiments, the data 238 can include data indicative of the environmental parameter detected by the sensor(s) 210.

Additionally, as shown in FIG. 4, the control device(s) 230 can include a communications interface 240. In example embodiments, the communications interface 240 can include associated electronic circuitry that can be used to communicatively couple the control device(s) 230 with other devices, such as the sensor(s) 210 and the speaker 220. In some embodiments, the communication interface 240 can allow the control device(s) 230 to communicate directly with other devices. In some embodiments, the communication interface 240 can provide for communication with other devices over a network 170 (FIG. 3).

Referring again to FIG. 3, the network 170 can be any suitable type of network. The network 170 can be any suitable type of network, such as a local area network (e.g., intranet), wide area network (e.g., internet), low power wireless network (e.g., Bluetooth Low Energy (BLE), Zigbee, etc.), or some combination thereof and can include any number of wired or wireless links. In general, communication over the network 170 can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable wired and/or wireless communication technologies can be used without deviating from the scope of the present disclosure.

In some implementations, the control device(s) 230 can perform one or more control actions associated with controlling operation of the light source 110. For instance, the control action(s) can include activating (e.g., turn on) or deactivating (e.g., turn off) the light source 110. More specifically, the control device(s) 230 can perform a control action associated with flashing (e.g., blinking) the light source 110 at a predetermined frequency. In this way, the light source 110 can be used to provide a visual cue indicative of a detected environmental condition (e.g. fire).

Alternatively or additionally, the control device 230 can perform a control action associated with notifying an emergency provider of the detected environmental condition. For instance, the control action can comprise providing an automated message to a 911 operator. In this way, an emergency provider (e.g., policeman, fireman, emergency medical technician (EMT), etc.) can be dispatched to the first space 130. In addition, the control device(s) 230 can perform a control action associated with operation of the power supply 160. For instance, the control action can comprise deactivating the power supply 160 subsequent to notifying the emergency provider.

In some implementations, the control device(s) 230 can communicate with a user device 180 over the network 170. The user device 180 can be any suitable type of device, such as, for example, a personal computing device (e.g., laptop or desktop), a mobile computing device (e.g., smartphone or tablet), a wearable computing device, an embedded computing device, a remote computing device, or any other suitable type of computing device. The user device 180 can include one or more computing device(s) 184 with the same or similar components as described above with regard to the control device(s) 230. For instance, the computing device 184 of the user device 180 can include one or more processors and one or more memory devices that store instructions that are executable by the processor to cause user device 180 to perform operations, such as e.g., communicating one or more control signals over the network 170 to the control device(s) 230. In this way, a user can control operation of the light source 110 via the user device 180.

In some implementations, the control device(s) 230 can communicate data to the user device 180 via the communication interface 240. For instance, the control device(s) 230 can provide data captured by the sensor(s) 210 to the user device 180. The information (e.g., data) can be displayed (e.g., via a display device) or otherwise presented (e.g., via audio speakers) to the user through a suitable interface 182. In this way, a user can observe data collected by the sensor(s) 210.

In some implementations, the control device(s) 230 can communicate a notification or alert indicative of the detected environmental condition (e.g., fire) to the user device 180 via the communication interface 240. For instance, the computing device(s) 230 can communicate an electronic message (e.g., email, short message service (SMS) text message, etc.) indicating the detected environmental condition. In this way, a person using the user device 180, such as a homeowner, can become apprised of the detected environmental condition.

As shown, the environmental detection system 200 can include a power circuit 250 configured to receive an input power from the power supply 160 and convert the input power to an output power suitable for powering the sensor(s) 210, the speaker 220, and the control device(s) 230. In some embodiments, the power circuit 250 can be configured to provide different driving currents to the sensor(s) 210, speaker 220, and the control device(s) 230. For instance, the power circuit 250 can include one or more of a multi-channel driver circuit, a current splitter circuit, one or more current regulators, and/or other devices that can be used to independently provide a driver current to the sensor(s) 210, the speaker 220, and the control device(s) 230.

Figure 5:
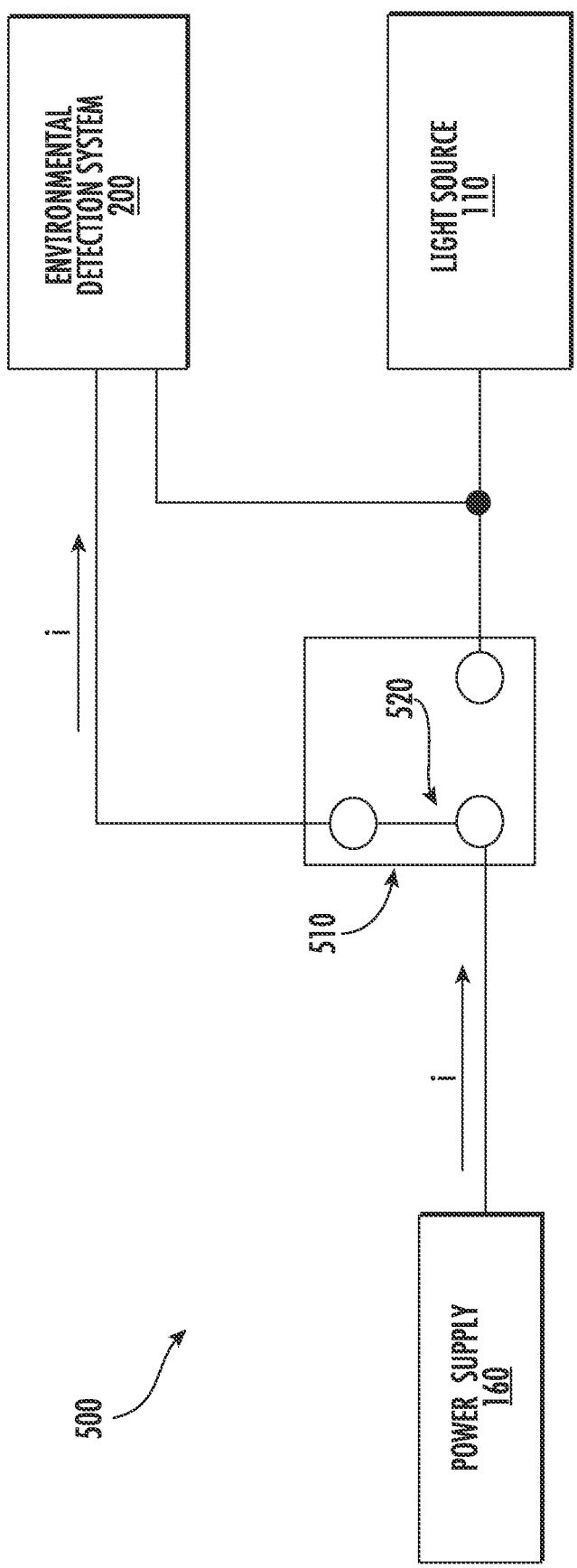
FIG. 5 provides a schematic of a circuit according to example embodiments of the present disclosure.
Figure 6:
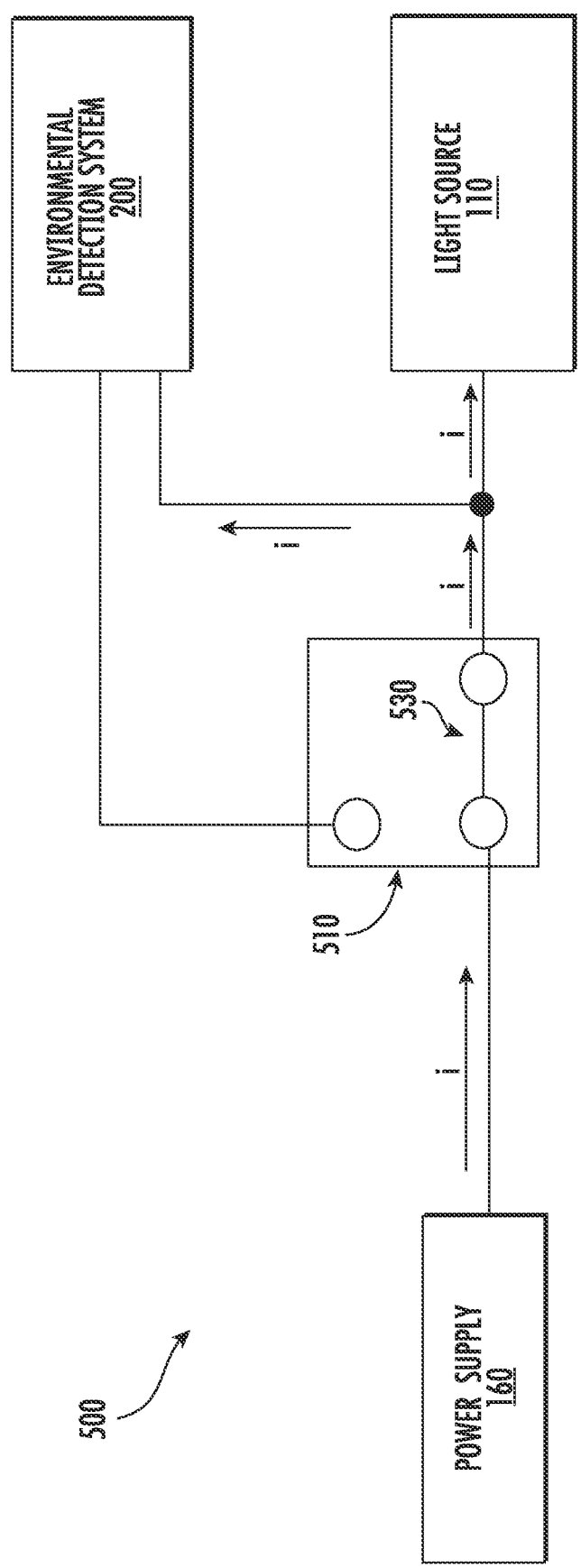
FIG. 6 provides a schematic of a circuit according to example embodiments of the present disclosure.

Referring now to FIGS. 5 and 6, a schematic of a circuit 500 is provided according to example embodiments of the present disclosure. As shown, the circuit 500 can include a switch 510. In some implementations, the switch 510 can be a single pole double throw (SPDT) switch movable between a first position 520 and a second position 530. It should be appreciated that the switch 510 can be the switch 150 discussed above and depicted in FIGS. 1 and 2. When the switch 510 is in the first position 520, the environmental detection system 200 can receive electrical power from the power supply 160. However, when the switch 510 is in the second position 530, both the environmental detection system 200 and the light source 100 can receive electrical power from the power supply 160. In this way, the environmental detection system 200 can receive a continuous supply of electrical power from the power supply 160 (e.g., mains power supply or backup power supply) regardless of whether the light source 110 of the lighting fixture 100 (FIG. 1) is activated.

As mentioned above, the power supply 160 can comprise a mains power supply (e.g. AC mains) for a building. In example embodiments, the environmental detection system 200 can be coupled to the mains power supply via the switch 510. However, in some instances, the mains power supply for the building may become inoperable due to, for instance, a power outage. In such instances, the environmental detection system 200 can be coupled to a backup power supply (e.g., uninterruptable power supply) via the switch 510. In this manner, the environmental detection system can remain coupled to a continuous supply of electrical power.

Figure 7:
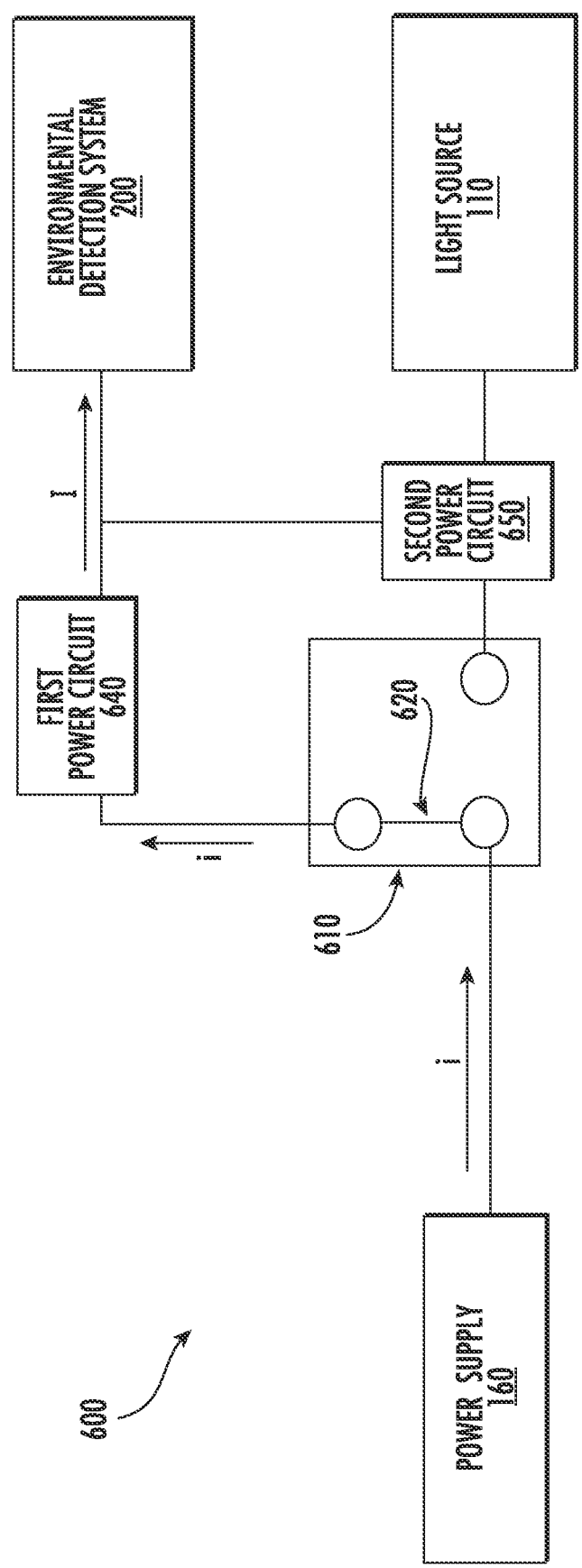
FIG. 7 provides a schematic of a circuit according to example embodiments of the present disclosure.
Figure 8:
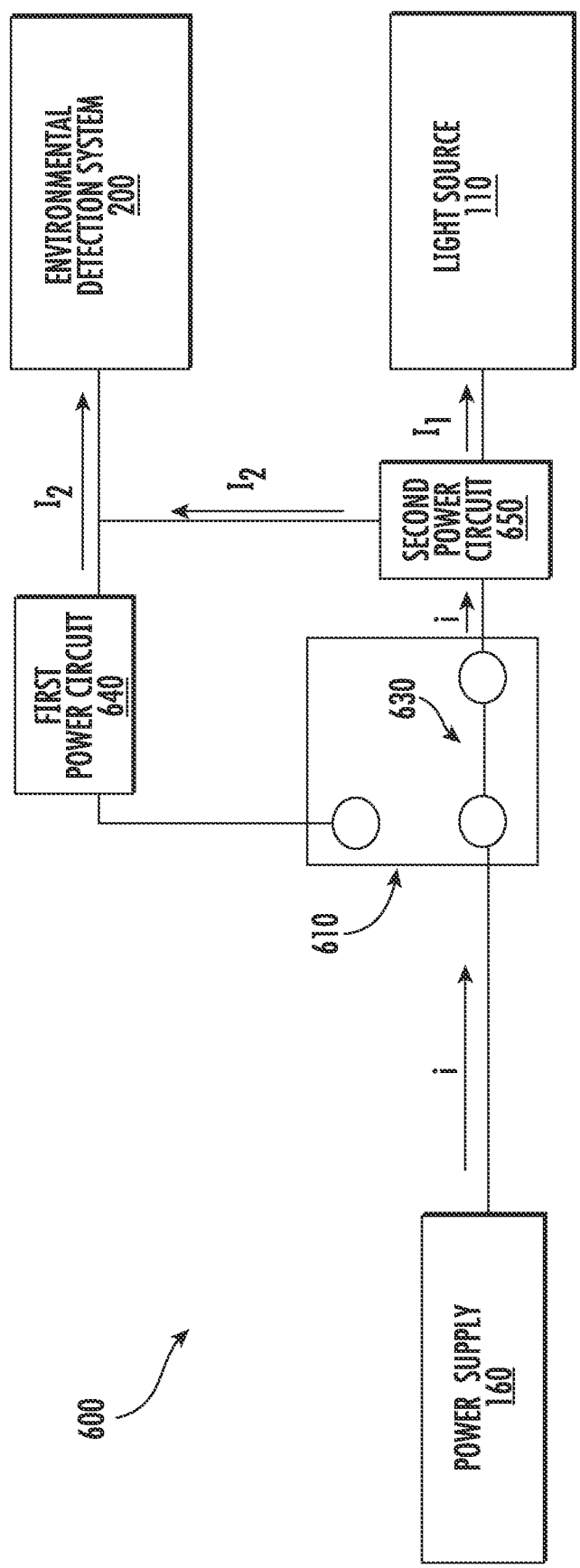
FIG. 8 provides a schematic of a circuit according to example embodiments of the present disclosure.

Referring now to FIGS. 7 and 8, a schematic of another circuit 600 is provided according to example embodiments of the present disclosure. As shown, the circuit 600 can include a switch 610 movable between at least a first position 620 and a second position 630. The circuit 600 also includes a first power circuit 640 and a second power circuit 650. When the switch 610 is in the first position 620, the first power circuit 640 can receive an input power (e.g., AC power) from the power supply 160 and can convert the input power to a suitable output power (e.g., DC power) for the environmental detection system 200. More specifically, the first power circuit 640 can be configured to provide a driver current I to the environmental detection system 200.

When the switch 610 is in the second position 630, however, the second power circuit 650 can receive an input power (e.g., AC power) from the power supply 160 (e.g., AC mains or backup power supply) and can convert the input power to a suitable output power (e.g., DC power) for both the environmental detection system 200 and the light source 110. In some implementations, the second power circuit 650 can be configured to provide different driving currents to the light source 110 and the environmental detection system 200. For instance, the second power circuit 650 can include one or more of a multi-channel driver circuit, a current splitter circuit, one or more current regulators, and/or other devices that can be used to independently provide a first driver current $I_1$ to the light source 110 and a second driver current $I_2$ to the environmental detection system 200. In this way, the environmental detection system 200 can receive a continuous supply of electrical power from the power supply 160 (e.g., mains power supply or backup power supply) regardless of whether the light source 110 of the lighting fixture 100 (FIG. 1) is activated.

As mentioned above, the power supply 160 can comprise a mains power supply (e.g. AC mains) for a building. In example embodiments, the environmental detection system 200 can be coupled to the mains power supply via the switch 610. However, in some instances, the mains power supply for the building may become inoperable due to, for instance, a power outage. In such instances, the environmental detection system 200 can be coupled to a backup power supply (e.g., uninterruptable power supply) via the switch 610. In this manner, the environmental detection system can remain coupled to a continuous supply of electrical power.

Figure 9:
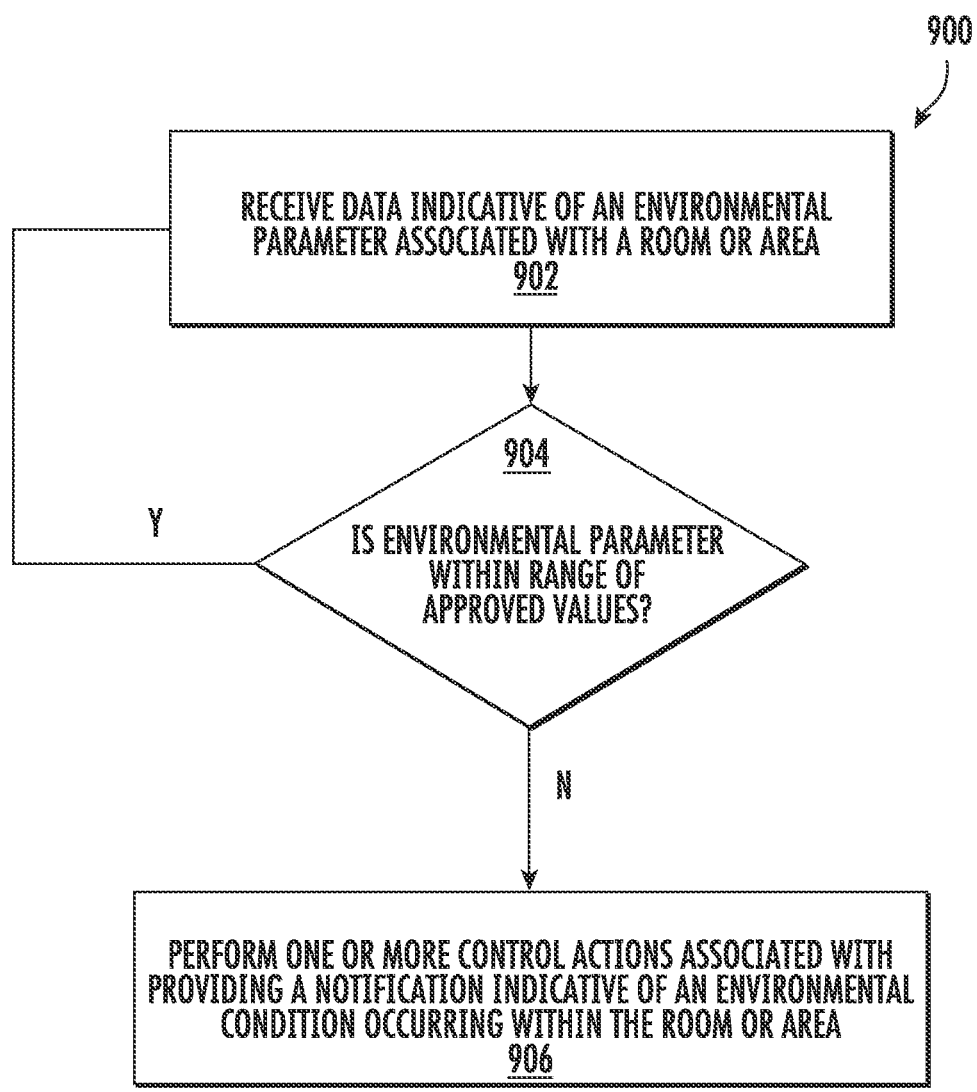
FIG. 9 provides a flow diagram of a method for according to example embodiments of the present disclosure.

Referring now to FIG. 9, a flow diagram of one example method 900 for determining a condition associated with a room or area via an environmental detection system of a lighting fixture is provided according to example embodiments of the present disclosure. In general, the method 900 will be discussed with reference to the lighting fixture 100 and environmental detection system 200 described above with reference to FIGS. 1 through 3. However, it should be appreciated by those of ordinary skill in the art that the disclosed method 900 can generally be implemented with lighting fixtures having any other suitable configuration. In addition, although FIG. 9 depicts steps performed in a particular order for purposes of illustration and discussion, the method discussed herein can be omitted, rearranged, combined, and/or adapted in various ways without deviating from the scope of the present disclosure.

At (902), the method 900 can include receiving, at a control device of the environmental detection system, data indicative of an environmental parameter associated with the room or area in which the lighting fixture is located. In example embodiments, the control device can receive a data signal from a sensor of the environmental detection system. The data signal can be indicative of the environmental parameter associated with a room or area in which the lighting fixture is located. In some implementations, the data signal can indicate an amount of CO present within the room or area.

At (904), the method 900 can include comparing, by the control device, the environmental parameter received at (902) against a range of approved values for the environmental parameter. In some implementations, the method 900 can revert to (902) when the control device determines the environmental parameter associated with the room or area is within the range of approved values. Alternatively, the method 900 can proceed to (906) when the control device determines the environmental parameter associated with the room or area falls outside the range of approved values for the environmental parameter.

At (906), the method 900 can include performing, by the control device, one or more control actions associated with providing a notification indicative of an environmental condition occurring within the room or area. In example embodiments, the control action(s) can be associated with controlling operation of the light source of the lighting fixture. For instance, the control action can include blinking (e.g., flashing) the light source at a predetermined frequency. In this way, the light source can provide a visual indicator to one or more person within the room or area. More specifically, the visual cue can indicate presence of an environmental condition (e.g., fire) detected based, at least in part, on the comparison of the environmental parameter against the range of approved values for the environmental parameter at (904).

Alternatively or additionally, the control action(s) can include controlling operation of the speaker of the environmental detection system. For instance, the control action can include broadcasting an audible indicator or alert over the speaker. In this way, the speaker can provide an audible indicator or cue to one or more persons within the room or area. More specifically, the audible indicator can indicate occurrence of the environmental condition (e.g., fire) within the room or area.

In some implementations, the control action(s) can include communicating an electronic message (e.g., email, short message service (SMS) text message, etc.) over the network to one or more user devices. More specifically, the electronic message can be provided to interested parties (e.g., homeowner, 911 dispatch operator, etc.). In this way, the interested parties can become apprised of the detected environmental condition and take the appropriate actions to resolve the environmental condition.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting fixture, comprising:
a switching device; and
an environmental detector coupled to a continuous supply of electrical power via the switching device, irrespective of a position of the switching device, the environmental detector including one or more sensors operable to detect an environmental parameter associated with a space in which the lighting fixture is located.

2. The lighting fixture of claim 1, wherein the environmental detection system is coupled to a mains power supply via the switching device, the mains power supply configured to provide the continuous supply of electrical power.

3. The lighting fixture of claim 2, wherein when the mains power supply is inoperable, the environmental detection system is coupled to a backup power supply via the switching device, the backup power supply configured to provide the continuous supply of electrical power.

4. The lighting fixture of claim 1, wherein the environmental detection system further comprises one or more control devices having one or more processors and one or more memory devices, the one or more memory devices storing instructions that, when executed by the one or more processors, cause the one or more processors to perform operations, the operations comprising:
receiving data indicative of an environmental parameter associated with a room or area in which the lighting fixture is mounted;
determining whether the environmental parameter is within a predefined range of values associated with the environmental parameter; and
responsive to determining the environmental parameter is not within the predefined range of values, providing a notification indicative of an environmental condition occurring within the room or area.

5. The lighting fixture of claim 4, wherein the notification is communicated over a wired or wireless connection to an output device capable of emitting an audible alert or a providing a visual cue indicative of the environmental condition.

6. The lighting fixture of claim 4, wherein the notification comprises at least one of a visual notification and an audible notification, the visual notification associated with flashing a light source of the lighting fixture at a predetermined frequency, the audible notification associated with emitting an audible sound via one or more speakers of the environmental detection system.

7. The lighting fixture of claim 6, wherein the output device is a portable electronic device capable of emitting or projecting a visual cue indicative of the environmental condition via an electronic display.

8. The lighting fixture of claim 7, wherein the portable electronic device is a mobile phone.

9. The lighting fixture of claim 1, wherein the lighting fixture further comprises a light source including one or more light emitting diode (LED) light sources.

10. The lighting fixture of claim 1, wherein the environmental parameter comprises at least one of a presence of mold spores, pollen, dust, natural gas, radon, radiation, or chemical fumes within a room or area in which the lighting fixture is mounted.

11. A method comprising:
receiving, at one or more control devices, data from a sensor, the sensor coupled to a continuous supply of electrical power; and
manipulating a switching device between a first position and a second position based on the data,
wherein when the switching device is in a first position, the sensor is coupled to the continuous supply of electrical power and a first powered device is decoupled from the continuous supply of electrical power, and
wherein when the switching device is in a second position that is different than the first position, the first powered device and the sensor are each coupled to the continuous supply of electrical power.

12. The method of claim 11, wherein the environmental parameter comprises at least one of a presence of mold spores, pollen, dust, natural gas, radon, radiation, or chemical fumes within a room or area.

13. The method of claim 11, wherein manipulating the switching device comprises moving the switching device from a first position to a second position.

14. The method of claim 11, wherein the environmental parameter comprises at least one of an amount of smoke present within the room or area and an amount of carbon monoxide present within the room or area.

15. The method of claim 11, wherein the continuous supply of electrical power comprises alternating current (AC) power.

16. A system for detecting an environmental condition associated with a room or area, the system comprising:
a lighting fixture disposed within the room or area, the lighting fixture comprising a light source selectively coupled to a continuous supply of electrical power via a switching device;
an environmental detection system disposed within the room or area, the environmental detection system coupled to the continuous supply of electrical power via the switching device, regardless of the position of the switching device, the environmental detection system comprising one or more sensors operable to detect an environmental parameter associated with the room or area,
wherein the environmental detection system further comprises one or more control devices having one or more processors and one or more memory devices, the one or more memory devices storing instructions that, when executed by the one or more processors, cause the one or more processors to perform operations, the operations comprising:
receiving data from the one or more sensors indicative of an environmental parameter associated with the room or area in which the lighting fixture is mounted;
determining whether the environmental parameter is within a predefined range of values associated with the environmental parameter; and
responsive to determining the environmental parameter is not within the predefined range of values, providing a notification indicative of an environmental condition occurring within the room or area.

17. The system of claim 16, wherein the environmental detection system is coupled to a mains power supply via the switching device, the mains power supply configured to provide the continuous supply of electrical power.

18. The system of claim 17, wherein when the mains power supply is inoperable, the environmental detection system is coupled to a backup power supply via the switching device, the backup power supply configured to provide the continuous supply of electrical power.

19. The system of claim 16, wherein the notification wherein the notification is communicated over a wired or wireless connection to an output device capable of emitting an audible alert or a providing a visual cue indicative of the environmental condition.

20. The system of claim 19, wherein the output device is a portable electronic device capable of emitting or projecting a visual cue indicative of the environmental condition via an electronic display.

* * * * *